US008596163B2

(12) United States Patent
Yoshida et al.

(10) Patent No.: US 8,596,163 B2
(45) Date of Patent: Dec. 3, 2013

(54) INSTALLATION STRUCTURE OF A PEDAL STROKE SENSOR

(75) Inventors: Shuichi Yoshida, Anjo (JP); Hideki Endo, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/790,430

(22) Filed: May 28, 2010

(65) Prior Publication Data

US 2010/0313699 A1 Dec. 16, 2010

(30) Foreign Application Priority Data

Jun. 16, 2009 (JP) .................. 2009-143239

(51) Int. Cl.
B60T 7/04 (2006.01)
F16D 65/28 (2006.01)
G05G 1/30 (2008.04)
G05G 1/44 (2008.04)
B60T 7/06 (2006.01)

(52) U.S. Cl.
CPC .. B60T 7/042 (2013.01); B60T 7/06 (2013.01)
USPC .............................. 74/512; 74/560

(58) Field of Classification Search
USPC ........................ 74/512–514, 560
IPC ........................ B60T 7/06
See application file for complete search history.

(56) References Cited

U.S. PATENT DOCUMENTS

| 5,887,488 | A | * | 3/1999 | Riggle | 74/514 |
| 6,023,995 | A | * | 2/2000 | Riggle | 74/560 |
| 6,321,617 | B1 | * | 11/2001 | Schwyn | 74/512 |
| 6,370,983 | B1 | * | 4/2002 | Nakamura | 74/514 |
| 6,766,713 | B2 | * | 7/2004 | Sundaresan et al. | 74/512 |
| 6,918,318 | B2 | * | 7/2005 | Willemsen | 74/560 |
| 7,530,289 | B2 | * | 5/2009 | Willemsen et al. | 74/512 |
| 8,069,750 | B2 | * | 12/2011 | Willemsen et al. | 74/512 |
| 2006/0230870 | A1 | * | 10/2006 | Fukase | 74/512 |
| 2007/0137396 | A1 | | 6/2007 | Mahendra et al. | |
| 2007/0245844 | A1 | * | 10/2007 | Yokoyama et al. | 74/470 |
| 2010/0313698 | A1 | * | 12/2010 | Yoshida et al. | 74/512 |
| 2010/0313699 | A1 | * | 12/2010 | Yoshida et al. | 74/512 |

FOREIGN PATENT DOCUMENTS

| JP | 60-99729 | A | 6/1985 |
| JP | 3-67315 | A | 3/1991 |
| JP | 4-358731 | A | 11/1992 |
| JP | 7-150987 | A | 6/1995 |
| JP | 9-207606 | A | 8/1997 |
| JP | 2000-320349 | A | 11/2000 |
| JP | 2001-253326 | A | 9/2001 |
| JP | 2006-117071 | A | 5/2006 |
| JP | 2 003 434 | A2 | 12/2008 |

OTHER PUBLICATIONS

Translation of JP 60-99729, Ezoe et al., Mar. 6, 1985.*

* cited by examiner

Primary Examiner — Vinh Luong

(74) Attorney, Agent, or Firm — Birch, Stewart, Kolasch & Birch, LLP

(57) ABSTRACT

A pedal stroke sensor is placed at a point of a pedal bracket, which is located away from a pedal, and where the pivot of the pedal stroke sensor is not aligned with the pivot of the pedal; the pedal and the pedal stroke sensor, which are thus separated away from each other, are connected together by a link mechanism; and a pedal deflection is transmitted through the link mechanism to the pedal stroke sensor.

3 Claims, 3 Drawing Sheets

INSTALLATION STRUCTURE OF A PEDAL STROKE SENSOR

BACKGROUND OF THE INVENTION

1. Field of the Invention

The invention relates to the installation structure of a pedal stroke sensor for detecting the deflection angle of a pedal.

2. Description of the Related Art

In an automobile (vehicle), pedals are fixed under the dashboard so that the driver may brake and accelerate the vehicle by stepping on these pedals.

In recent years, it has become more and more common to electrically control a device according to a detected signal that is detected by a pedal stroke sensor for detecting pedal deflection.

Many of such pedal stroke sensors, as described in Kokai No. 3-67315, are fixed to a pedal so that the pivot of the pedal stroke sensor is fitted to that of the pedal. A sensor arm (component radially protruding from the pivot of the sensor) serving as an input section of the pedal stroke sensor is engaged with a part of the pedal, and thus transmits pedal deflection to the pedal stroke sensor.

However, a dashboard to which pedals are fixed is equipped with a lot of devices in front of the driver's feet, so that the pedal stroke sensor often cannot be installed near the pedal.

In such a case, the pedal stroke sensor is placed in a pedal bracket to be located away from the pedal, and is installed so that an engaging member attached to the pedal and the sensor arm of the pedal stroke sensor are slidably engaged together in order to actualize the transmission by engagement. By this means, pedal deflection can be transmitted to the pedal stroke sensor located in an unobtrusive place.

The pedal stroke sensor is required to accurately detect a pedal deflection angle between the initial position of the pedal and the pressed position of the pedal.

The structure in which the sensor arm and the engaging member are slidably engaged together makes it possible to detect a pedal deflection angle with high accuracy when distance between the sensor arm and the pedal is short. On the other hand, if the sensor arm and the pedal are located far away from each other, the accurate detection is difficult.

In addition, uneven contact between the sensor arm and the engaging member during a pedal stroke makes a gap between these two components. As a consequence, even if the above-mentioned structure is established, backlash easily occurs between components. This causes a position gap between the initial position of the pedal and the position to which the pedal is returned after being pressed, so that there is a possibility that the pedal stroke sensor fails to detect an exact pedal deflection angle.

SUMMARY OF THE INVENTION

It is an object of the invention to provide an installation structure of a pedal stroke sensor, which enables even a pedal stroke sensor placed far away from a pedal to detect a pedal deflection angle with ease and accuracy.

In order to achieve the object, the invention has a pedal bracket that rotatably supports a pedal, and a pedal stroke sensor that is provided to the pedal bracket, makes rotating displacement by receiving a deflection of the pedal around a pivot of the pedal at an input section, and detects a pedal deflection angle of the pedal. The pedal stroke sensor is placed at a point of the pedal bracket, which is located away from the pedal, and where a pivot of the pedal stroke sensor is not aligned with the pivot of the pedal. The pedal and the input section of the pedal stroke sensor, which are located away from each other, are joined together by a link mechanism. The deflection of the pedal is transmitted through the link mechanism to the pedal stroke sensor.

By employing such a link mechanism, the pedal deflection can be easily transmitted to the pedal stroke sensor even if the pedal stroke sensor is placed far away from the pedal. The link mechanism is moreover capable of transmitting displacement without causing backlash. Even if the pedal stroke sensor is placed away from the pedal, there occurs no position gap of the pedal, which triggers an error.

Consequently, even the pedal stroke sensor placed far away from the pedal is capable of detecting the pedal deflection angle with ease and accuracy.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

The present invention will be described below on the basis of one embodiment shown in FIGS. 1 to 3.

Figure 1:
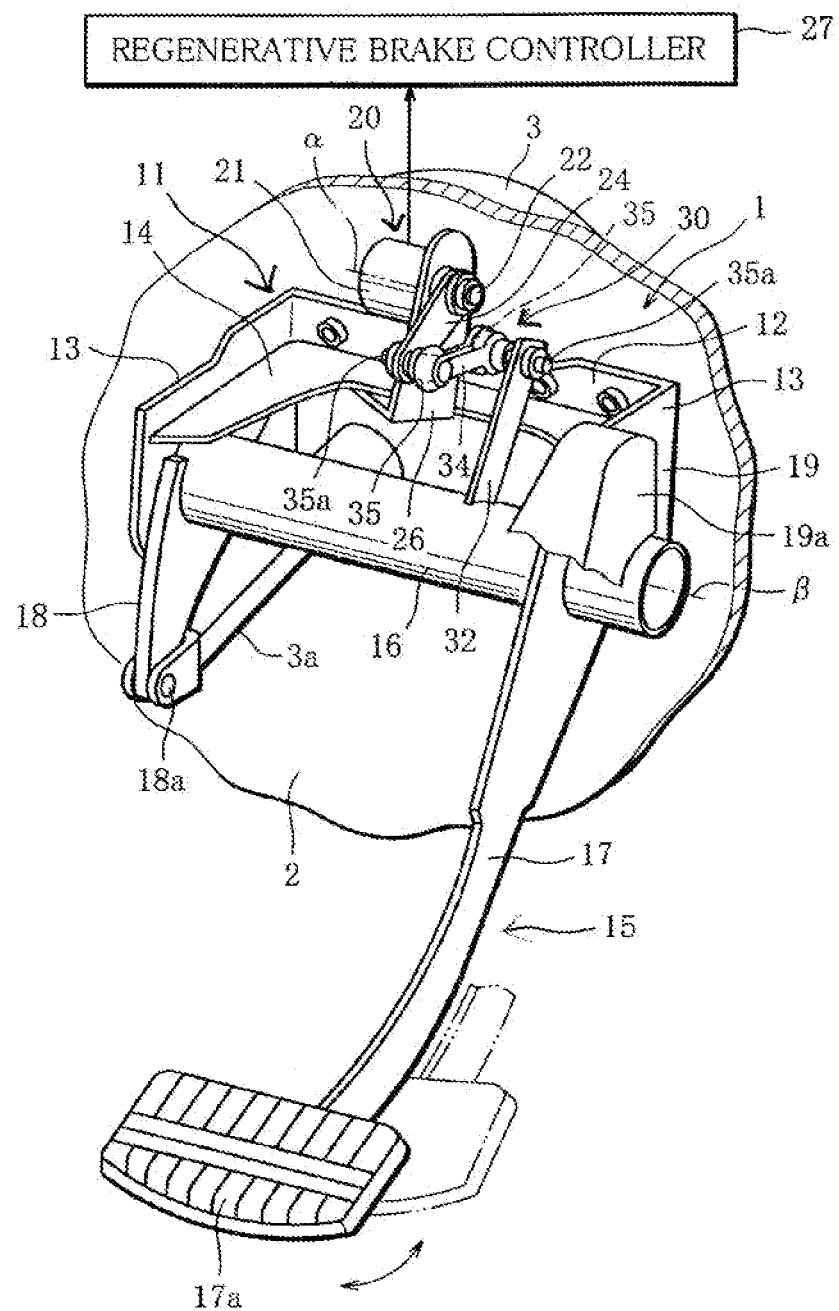
FIG. 1 is a perspective view showing an installation structure of a pedal stroke sensor according to one embodiment of the invention.

FIG. 1 is a perspective view showing a brake pedal unit 1 that is installed under the driver's seat of a vehicle, for example, an electric vehicle. FIG. 2 is a sectional side view of the brake pedal unit 1.

As illustrated in FIG. 1, a booster 3 with a hydraulic cylinder serving as a hydraulic braking device that provides a braking force to each wheel is mounted on a lower part of an exterior-side panel face of a dash panel 2 (member dividing the inside and outside of the vehicle) that is located in an interior frontmost section of the electric vehicle. An operating rod 3a of the booster 3 extends through the dash panel 2 and projects into the vehicle interior. The brake pedal unit 1 is disposed in the dash panel 2 to be situated in an interior-side panel face of the dash panel 2, from which the operating rod 3a is projecting.

Referring to the brake pedal unit 1, reference marks 11, 15 and 20 represent a pedal bracket, a brake pedal (corresponding to the pedal of the present invention), and a pedal stroke sensor, respectively.

The pedal bracket 11 includes a horizontal wall 12 made up, for example, of a plate disposed along the panel face of the dash panel 2, a pair of vertical walls 13 projecting from both vehicle-width-side end portions of the horizontal wall 12 into the vehicle interior, and a reinforcing member 14 fixed along inner faces of the horizontal wall 12 and the vertical walls 13. A wall face of the horizontal wall 12 and end portions of the vertical wall 13 are fixed to the dash panel 2 with screw cramps.

The brake pedal 15 has an integral structure that is formed of a support shaft 16 made up, for example, of a pipe member, a pedal arm 17 that is attached to and suspended from one end of the support shaft 16, a tread section 17a provided to a lower end portion of the pedal arm 17, and a lever 18 attached to a shaft portion at the opposite side to the pedal arm 17. Both ends of the support shaft 16 are rotatably supported by the vertical walls 13, and the suspended pedal arm 17 is located at the driver's feet. The lever 18 has a tip end that is rotatably joined to a tip end of an the operating rod 3a projecting into the vehicle interior by using a pin member 18a. By this means, when the tread section 17a of the brake pedal 15 is pressed, a deflection of the pedal arm 17 is transmitted through the support shall 16 and the lever 18 to the booster 3, thereby producing hydraulic pressure that is required for braking.

For example, a guide member 19a that guides the pedal arm 17 in a downward direction is disposed above the pedal arm 17 as a component of a pedal retreat inhibiting device 19 that inhibits the retreat of the brake pedal 15 at the time of impact on the front of the vehicle.

The pedal stroke sensor 20 is a sensor that detects a pedal deflection angle of the brake pedal 15. The pedal stroke sensor 20 includes a sensor body 21 having a rotary detection structure, and has an input shaft 22 (corresponding to an input section of the present invention) that inputs pedal deflection to one end portion of the sensor body 21. The rotatable input shaft 22 is attached with a sensor arm 24 (corresponding to an input arm of the present invention). The sensor arm 24 is so disposed as to radially project from a pivot α of the input shaft 22, which is a pivot of the pedal stroke sensor 20. When the sensor arm 24 is deflected, the deflection is inputted from the input shaft 22 to the sensor body 21.

The pedal stroke sensor 20 is located not in the brake pedal 15 but in a place far away from the brake pedal 15, namely, in this specification for example, between the brake pedal 15 and the lever 18 in order to prevent the pedal stroke sensor 20 from interfering with various devices (not shown) arranged on the periphery of the brake pedal unit 1. The pedal stroke sensor 20 is supported in the pedal bracket 11 by means of a sensor-fixing bracket 26 that is fixed, for example, to the reinforcing member 14 and one side of the horizontal wall 12. More specifically, the pedal stroke sensor 20 is disposed so that the pivot α is substantially parallel to a pivot β of the support shaft 16, which is also a pivot of the brake pedal 15, in order to smoothly receive the deflection of the brake pedal 15.

The pedal stroke sensor 20 is connected to a regenerative braking controller 27 installed in the electric vehicle, and is capable of outputting a detected signal to the regenerative braking controller 27.

In this manner, the pedal stroke sensor 20 and the brake pedal 15, which are located away from each other, are connected together by the link mechanism 30.

Figure 2:
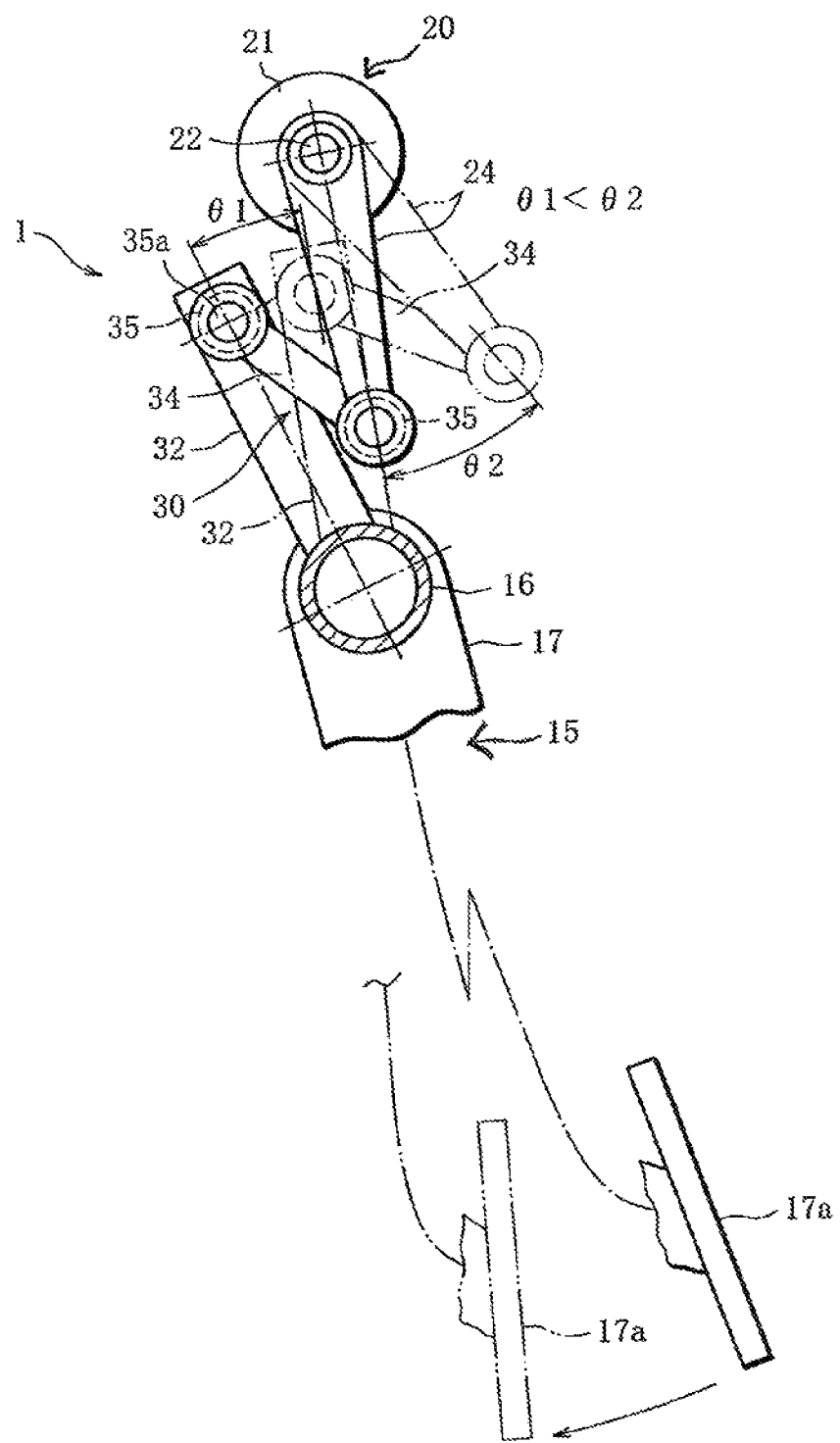
FIG. 2 is a sectional side view of a link mechanism used in the installation structure.
Figure 3:
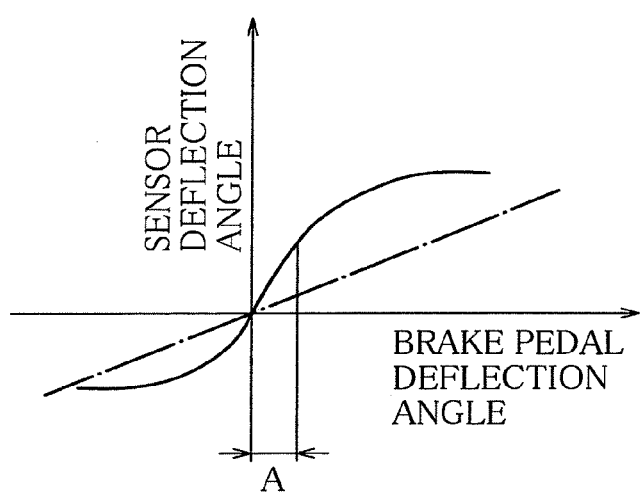
FIG. 3 is a diagram showing a deflection behavior of the pedal stroke sensor, which is caused by the link mechanism.

As illustrated in FIGS. 1 and 2, the link mechanism 30 has a structure in which a tip end of an arm 32 (corresponding to an output arm of the present invention) projecting from an outer circumferential surface of the support shaft 16 to be located adjacently to the input shaft 22 of the pedal stroke sensor 20 and a tip end of the sensor arm 24 disposed in the input shaft 22 of the pedal stroke sensor 20 are rotatably joined together by using a straight link bar 34 (corresponding to a link member of the present invention). For example, when the brake pedal 15 is in an initial position, the arm 32 is arranged to point diagonally forward, extending in a longitudinal direction of the pedal arm 17, whereas the sensor arm 24 is arranged to point in a diagonally rearward direction that is opposite to the direction of the arm 32.

A ball joint 35 is embedded in each end portion of the link bar 34. Connecting screw shafts 35a of the ball joints 35, which project from the end portions of the link bar 34, are screwed into end portions of the arms 24 and 32 in the initial position. The link bar 34 thus connects the arms 24 and 32 separated from each other, and simultaneously absorbs a position gap by using the ball joints 35.

As shown in FIG. 2, sections of the link mechanism 30, which are formed of the arm 32, the link bar 34, and the sensor arm 24, are designed so that a pedal deflection angle θ2 of the sensor arm 24 is greater than (for example, several times as great as) a pedal deflection angle θ1 made by the arm 32 when the brake pedal 15 is pressed. Due to difference between the deflection angles θ1 and θ2 (θ1<θ2), the pedal deflection angle θ1 of the brake pedal 15 is amplified and transmitted to the pedal stroke sensor 20, thus improving the sensitivity of the pedal stroke sensor 20. As indicated by an A zone in a diagram of FIG. 3 showing an amplifying ability, the link mechanism 30 is set so that the pedal deflection angle α is drastically changed to a great degree in an initial pressing stage where the pressing of the brake pedal 15 is just started, and hydraulic pressure is therefore still stationary. In other words, the link mechanism 30 has a structure in which the pedal deflection angle θ2 is considerably amplified and inputted to the pedal stroke sensor 20 only in the initial pressing stage. The link mechanism 30 is thus set up by properly changing a relative position (mounting angle) between the link bar 34 and the sensor arm 24 or between the link bar 34 and the arm 32, and changing a length ratio of the link bar 34, the sensor arm 24 and the arm 32.

The brake pedal 15 and the pedal stroke sensor 20, which are located far away from each other, are connected together by the link mechanism 30 that provides even contact and does not make a clearance therebetween. This makes it possible to transmit the pedal deflection angle of the brake pedal 15 to the pedal stroke sensor 20 without causing the position gap of the brake pedal 15, which triggers an error.

As shown by arrows in FIGS. 1 and 2, when the brake operation (pressing) rotates the pedal arm 17 using the support shaft 16 as a fulcrum, the lever 18 is moved to actuate the booster 3, thereby generating hydraulic pressure required for braking. At this time, the deflection of the pedal arm 17 is transmitted from the arm 32 extending from the outer circumferential surface of the support shaft 16 formed integrally with the pedal arm 17 through the link bar 34 to the sensor arm 24. As a result of this link motion that rotates the sensor arm 24 by using the link bar 34, the pedal deflection angle of the brake pedal 15 is transmitted to the input shaft 22 of the pedal stroke sensor 20. The pedal stroke sensor 20 detects the pedal deflection angle of the brake pedal 15 from the deflection of the pedal arm 17. Upon receipt of the detected signal, the regenerative braking controller 27 provides regenerative brake to the electric vehicle.

The link mechanism 30 enables the even contact and transmits displacement without causing backlash caused by a clearance or the like. For this reason, when the brake pedal 15 returns, it returns to its original initial position. This prevents the generation of a position gap between the original position of the brake pedal 15 and the position to which the brake pedal 15 is returned after being pressed.

By employing the link mechanism 30, the deflection of the brake pedal 15 can be easily transmitted to the pedal stroke sensor 20 even if the pedal stroke sensor 20 is placed far away from the brake pedal 15. Moreover, the pedal deflection angle can be always detected with high accuracy by using the pedal stroke sensor 20.

Furthermore, the link mechanism 30 has the simple structure in which the arm 32 projecting from the outer circumferential surface of the support shaft 16 of the brake pedal 15 and the sensor arm 24 projecting from the outer circumferential surface of the input shaft 22 of the pedal stroke sensor 20 are rotatably joined together by using the link bar 34. Especially, the structure in which the link bar 34 is joined to the arms 24 and 32 with the ball joints 35 modifies a relative position tolerance between the pedal stroke sensor 20 and the support shaft 16. As a consequence, the accuracy of the pedal stroke sensor 20 is further improved.

Since the link mechanism 30 is designed to transmit the pedal deflection angle θ1 of the brake pedal 15 to the pedal stroke sensor 20 after amplifying the pedal deflection angle θ1 into the pedal deflection angle θ2. Such a structure enhances the sensitivity of the pedal stroke sensor 20. In the electric vehicle, therefore, the accurate detection of the pedal deflection angle of the brake pedal 15 is achieved, and the regenerative brake controller of the electric vehicle is controlled with a high degree of precision. The link mechanism 30 is designed so that the pedal deflection angle is extremely amplified in the initial pressing stage where the pressing of the brake pedal 15 is just started, and hydraulic pressure is therefore still stationary. The regenerative brake is thus fully applied in the initial pressing stage of the brake pedal 15 where the hydraulic pressure is difficult to rise. This makes it possible to effectively compensate a brake zone of the hydraulic braking device, in which the braking operation tends to delay.

The invention is not limited to the one embodiment described above. Various modifications can be made without deviating from the gist of the invention.

For example, the embodiment uses the straight link bar, but a curved link bar may be utilized instead of the straight one. Alternatively, the link mechanism may be constructed using a plurality of link bars.

The embodiment applies the invention to the structure that detects the deflection of the brake pedal. However, the invention may be applied to a structure that detects a deflection of another pedal. For example, the invention may be applied to the installation of a pedal stroke sensor for detecting the pedal deflection angle of an accelerator pedal.

What is claimed is:

1. A pedal unit, comprising:
a pedal bracket that rotatably supports a brake pedal;
a pedal stroke sensor that is provided to the pedal bracket, makes rotating displacement by receiving a deflection of the brake pedal around a pivot of the brake pedal at an input section, and detects a pedal deflection angle of the brake pedal; and
a link mechanism that links the brake pedal and the input section of the pedal stroke sensor, the link mechanism amplifying a pedal deflection angle of the brake pedal and transmits to the pedal stroke sensor and transmitting to the pedal stroke sensor, wherein:
the pedal stroke sensor is placed at a point of the pedal bracket, which is located away from the brake pedal, and where a pivot of the pedal stroke sensor is not aligned with the pivot of the brake pedal;
the brake pedal is rotatably supported in the pedal bracket by means of a support shaft formed integrally with the brake pedal;
the brake pedal and the input section of the pedal stroke sensor are located away from each other, and the link mechanism includes an output arm projecting from an outer circumferential surface of the support shaft, the output arm extending from the support shaft at a position offset from the brake pedal in an axial direction of the support shaft, an input arm radially projecting from the input section of the pedal stroke sensor, and a link member that rotatably connects a tip end of the output arm and a tip end of the input arm by using a ball joint respectively to each other, a length of the output arm and a length of the input arm being longer than a length of the link member; and
both ends of the support shaft are supported by opposing walls of the pedal bracket, and the pedal stroke sensor is provided in a region between the opposing walls.

2. The pedal unit, according to claim 1, wherein:
the pedal stroke sensor is placed at a point where the pivot of the pedal stroke sensor is parallel to the pivot of the brake pedal.

3. The pedal unit, according to claim 1, wherein:
the link mechanism amplifies the pedal deflection angle extremely in an initial pressing stage where the pressing of the brake pedal is just started, and hydraulic pressure is therefore still stationary.

* * * * *